COLOUR TELEVISION APPARATUS

Filed April 14, 1953

INVENTOR.
FERENC OKOLICSANYI
BY
Lippincott & Smith
ATTORNEYS

United States Patent Office 2,727,090

Patented Dec. 13, 1955

2,727,090

COLOUR TELEVISION APPARATUS

Ferenc Okolicsanyi, London, England

Application April 14, 1953, Serial No. 348,684

Claims priority, application Great Britain April 17, 1952

10 Claims. (Cl. 178—5.4)

In the specification of my British Patent No. 648,257 there are described various colour television apparatus in which colour electrodes in the form of grids of fine wires closely spaced are inserted into the cathode ray tubes at the transmitter and at the receiver. Now the insertion of such colour electrodes into the cathode ray tubes themselves is a delicate and difficult operation and I have shown in my said specification how, at the receiver, it is possible to have, instead of the internal colour electrode, a colour mask or screen outside the cathode ray tube and to use an ordinary standard black and white picture tube for the production of colour pictures. The advantages of such an arrangement will be obvious. The insertion of a colour electrode of the form mentioned above in the usually small camera tube of a transmitter is an even more difficult and delicate operation than the insertion of such a colour electrode into the picture tube since definition of the image on the camera tube screen is very critical and may easily be impaired by the presence of such a colour electrode within the camera tube. It is, therefore, one object of the present invention to provide improved transmitting apparatus, mainly for use in colour television systems of the kind set forth in my said specification, which will enable an ordinary standard cathode ray tube with a photosensitive or photo-conductive layer such as an iconoscope or more modern camera tube to be employed at the transmitter. A further object of the present invention, and a very important one, is to provide a colour television transmission system which requires the use of only a single camera tube, whereby the difficulties of the precise optical registration of the multiple images of the known Trinoscope system, which uses three cameras, can be avoided.

The colour television transmission system according to the present invention employs a cathode ray tube including a surface scanned by an electron beam, and comprises a colour filter, consisting of a plurality of sets of differently coloured strips arranged at an angle to the line scanning movement of said electron beam, a plurality of non-colour strips arranged between said sets of coloured strips, means for projecting an image of said colour filter and said non-colour strips on to the surface scanned by said electron beam, means for illuminating said colour filter and said non-colour strips so as to cause the scanning beam in scanning the image of the non-colour strips to produce therefrom index signals which are stronger than the signals produced due to the scanning of the image of the coloured strips, and means controlled by said stronger index signals for suppressing the signals due to all but one of said colour strips of each set sequentially for each colour.

In its preferred form the colour television transmission system according to the present invention employs a cathode ray tube including a surface scanned by an electron beam and comprises a colour filter consisting of a plurality of sets of differently coloured transparent strips arranged at an angle to the line scanning movement of said electron beam, a plurality of light-reflecting non-colour strips arranged between said sets of coloured strips, means for projecting an image of said colour filter and said light-reflecting strips on to the surface scanned by said electron beam, means for illuminating said colour filter and said light reflecting strips from the rear so as to cause the scanning beam in scanning the image of the light-reflecting strips to produce therefrom index signals which are stronger than the signals produced due to the scanning of the coloured strips and means controlled by said stronger index signals to suppress the signals due to all but one of said coloured strips of each set sequentially for each colour.

It is a characteristic feature of the present invention that the index signals do not, of themselves, effect the change from colour to colour in the transmitted signals. The actual change from colour to colour is effected by a synchronising signal through the intermediary of a timing circuit which serves to vary the delay within which the index signals are passed to a pulse generator the output of which is used to open a blocking circuit which, in the absence of the index signals, has a zero output and thus blocks all the signals, both "picture" signals and index signals from the transmitter. There is thus no automatic sequential change of the colour transmitted at the index signal frequency, and one is not dependent on a very high degree of precision in scanning. This advantage of not being dependent upon a high degree of precision of scanning is further enhanced by reason of the fact that the repetition frequency of the index signals is substantially higher than the frequency at which the colours are changed.

In order that this invention may be the more clearly understood and readily carried into effect, reference may be made to the accompanying drawings, in which.

Figure 1:
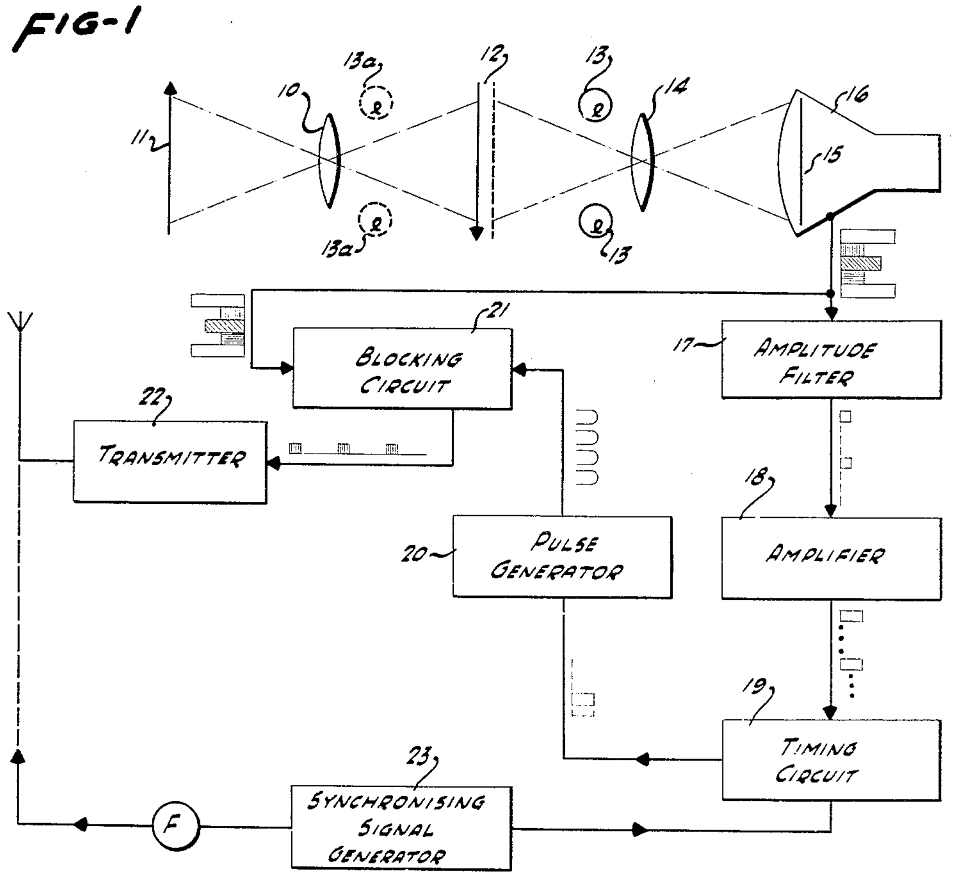
Figure 1 shows a colour television transmission system according to the present invention in one convenient form, with the signal elements in the various parts of the circuit indicated adjacent the parts in question.
Figure 2:
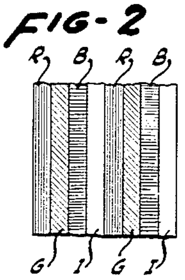
Figure 2 is a fragmentary elevation of the colour filter used therein.

Referring now to Figures 1 and 2 of the accompanying drawings, the colour television transmission system therein illustrated comprises a first lens system 10 which is adapted to throw an image of the object 11 to be televised on to a colour filter 12. This colour filter 12, as shown more particularly in Figure 2, comprises a plurality of sets of transparent colour strips which we will assume to be green, red and blue and which are shown at R, G and B in Figure 2. The colour filter also includes a plurality of non-colour strips I which preferably are light-reflecting and non-transparent. The light-reflecting and non-transparent strips I should not be such as to give an optical mirror reflection but rather a diffuse reflection. They may, therefore, be in the form of the so-called "silver screen" strips or may be luminescent. The colour filter 12 is illuminated from behind by suitable means, illustrated diagrammatically as the lamps 13, and an image of the colour filter with, of course, any picture thereon, is thrown by a second lens system 14 on to the sensitive surface 15 of an ordinary standard black and white camera tube 16. The surface 15 is adapted to be scanned by an electron beam in the usual way which is not illustrated in Figure 1. The brightness of the lamps 13 and the reflecting properties of the strips I in the colour filter are such that the signals originating therefrom as the surface 15 is scanned are much stronger than the signals originating from the transparent strips R, G and B and these stronger signals are used as index signals to discriminate between the colour values of the signals transmitted.

In the signal element sketches shown adjacent the various parts of the diagram of Figure 1 the signals due to the color strips R, G and B are indicated as *r*, *g* and *b* respectively and the index signals are indicated as *i*.

The output from the standard camera tube 16 with its full content of signals *r, g, b* and *i* is fed to an amplitude filter 17 which serves to suppress all the "real" or "picture" signals *r, g* and *b* due to the objects being televised and to pass on equal index signals *i*, as shown, originating at the precise moments when the scanning beam scans the image of the light-reflecting strips I. The output from the amplitude filter 17 is fed through an amplifier 18 which serves to amplify the signals *i*, as shown, and these amplified signals are fed to a time delay circuit 19, the output of which is fed to a pulse generator 20. The output from the pulse generator 20 is fed to a blocking circuit 21 into which the output from the standard camera tube 16 with its full content of signals, *r, g, b* and *i*, is fed. The output from the blocking circuit 21 is fed to a normal radio transmitter 22. Synchronising signals from a synchronising signal generator 23 are fed to the time delay circuit 19 for the purpose of varying the time delay imparted thereby to the amplified index signals *i* at a frequency which is the selected colour change frequency.

Let us now consider the operation of the transmission system and let us assume that the "time distance" of the strips R, G, B and I is 0.1 micro-second each, or 0.4 micro-second for each set, and let us further assume, for the sake of simplicity, that field sequential colour change is required. The function of the blocking circuit 21 is to withhold, or block, all signals coming from the camera tube 16 from the transmitter 22 until such time as it is triggered, or opened, by the output from the pulse generator 20. The time delay of the timing circuit 19 is set to 0.1 micro-second. This is controlled by a first synchronising signal from the synchronising signal generator 23 so that the amplified index signals emerging from the time delay circuit 19 are delayed by 0.1 micro-second, as shown at the side of the line between the timing circuit 19 and the pulse generator 20, where the dotted index signal is the timing of the input index signal to the timing circuit 19 and the full line signal the timing of the index signal which emerges from the timing delay circuit. The output from the pulse generator 20 then consists of pulses of 0.1 micro-second duration and these pulses are fed to the blocking circuit 21 to open the same. Hence all the signals *r, g, b* and *i* fed to the blocking circuit 21 from the camera tube 16 will be blocked with the exception of the signals *r* which are passed during the 0.1 micro-second when the blocking circuit is opened by the pulses from the pulse generator 20. Hence only the signals due to the red strips will be passed on to, and transmitted by, the transmitter 22. The synchronising signals from the synchronising signal generator 23 are, of course, fed to the transmitter, either directly or indirectly, as shown by the broken line and are transmitted. The next usual field synchronising signal is arranged to be different from the first-mentioned field synchronising signal and introduces such a time delay in the index signals fed to the pulse generator that the blocking circuit is only opened for signals occurring between 0.1 and 0.2 micro-second after the index signal. Hence, only the signals *g* due to the green strips G will be transmitted by the transmitter and all the other signals *r* and *b* as well as the index signals *i* will be suppressed. We thus have for the first field, transmission of signals having a red colour value and for the second field transmission of signals having a green colour value. For the blue signals *b* a third synchronising signal fed by the synchronising signal generator 23 to the timing circuit is again different from the first two synchronising signals and is arranged still further to delay the feeding of the amplified index signals to the pulse generator 20, with the result that the pulses fed by the pulse generator 20 to the blocking circuit 21 will only open that circuit for those signals occurring between 0.2 and 0.3 micro-second after the index signal. For this third field, therefore, we shall have only the signals *b*, corresponding to the blue strips B, passed to the transmitter and transmitted. All the other signals *r* and *g* as well as the index signals *i* will be suppressed. This cycle of operations is repeated again and again so that we shall have field sequential change in the colour value of the signals transmitted from red to green, to blue and then back to red again.

Figure 3:
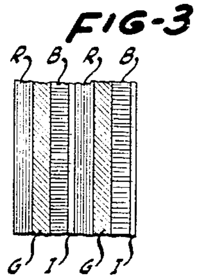
Figure 3 is a fragmentary elevation of a further form of colour filter for use according to the present invention.

Should there be any tendency for the index signals *i* to force themselves through to the transmitter due to their greater amplitude the modified form of filter shown in Figure 3 of the accompanying drawings may be used. Here the reflecting strips I are substantially narrower than the coloured strips R, G and B with the result that the index signals have a higher frequency and will be effectively suppressed in the transmitter which is equivalent to a low-pass filter.

In all cases in carrying out the present invention the repetition frequency of the index signals is substantially higher than the frequency at which the colours are changed, i. e. the frequency of the synchronising signals fed by the synchronising signal generator 23 to the time delay circuit 19. It results from this that the signals transmitted for each colour will not consist of a single pulse but of a number of pulses as indicated at the side of the line adjoining the blocking circuit 19 to the transmitter 22. In the transmitter 22 the plurality of impulses will be stretched out, as shown at the side of the transmitter, to give a pulse over the whole or substantially the whole of the time that the colour in question is being transmitted. This will be obvious even if, as in the example given above, pulses of 0.1 micro-second cause frequencies of 10 mc. and still higher harmonics in the local camera circuit and these will be stretched out automatically by the radio circuits.

In the system above described, the strips in the colour filter 12, which give rise to the index signals, are non-transparent and are adapted to reflect light from the lamps 13 on to the scanned surface 15. Such an arrangement is not essential but it has many advantages. For example, the amount of light reflected from the transparent colour strips R, G and B is very small indeed so that the overall D. C. level of the image is not raised and quite strong index signals can easily be obtained without watering the colours on the surface 15. It is possible also to make the strips I which give rise to the index signals transparent, in which case the colour filter 12 is illuminated from the front as, for example, by the lamps 13*a* but such an arrangement is not to be preferred. There is a general increase in the D. C. level of the signals which is obviously a disadvantage.

This will be easily understood when it is appreciated that the colour strips are transparent and hence will transmit some twenty to thirty times more of the light received from the lamps 13 than they will reflect of the said light.

It is important to note that the position and number of the vertical strips, both coloured and light-reflecting, in the filter at the transmitter, is, with the present invention, quite independent of the number used at the receiver, because the discrimination between the colours at the receiver is obtained purely from the synchronising signal generator 23 and is in no way dependent upon the repetition frequency of the index signals, and hence the number of sets of strips in the colour filter 12. This enables one to have a larger number of strips associated with the camera than with the receiver and vice-versa. Nor is it essential that what is, in effect, the reverse system of reception, referred to in my British Patent No. 648,257, be used, since all that one requires at the receiver is means for causing the received synchronising signals to discriminate between the colours.

The strips of the colour filter 12 may be arranged at any desired angle to the line scanning movement of the electron beam, preferably at right angles thereto.

Although in the embodiment described above field sequential colour change has been described, it will be obvious that the present invention is not limited to such an arrangement which has been selected purely with a view to facilitating the understanding of the present invention. One can just as easily employ line sequential change, or, in fact, any other desired sequential change which can be completely independent of any of the optical elements of the system. All that is necessary is to feed different synchronising signals from the synchronising signal generator 23 to the time delay circuit 19 at a frequency which is that at which it is desired the colour sequential change shall take place. In all cases, however, the frequency of the colour sequential change, even if it be of the order of the highest television frequencies transmitted, is substantially less than the repetition frequency of the index signals. This has the advantage that one is no longer dependent upon a very high degree of scanning precision, because it is, for example, quite immaterial whether the red signal consists of 5 or 5½ spaced pulses. These pulses, as explained above, are stretched out in the transmitter and the only difference will be a slight weakening of the particular colour at the receiver. If the index signals themselves were used to effect the frequency of colour change it will be obvious that a slight deviation from strict scanning accuracy could easily give an incorrect colour rendition.

In addition to the advantage of permitting the use of an ordinary unmodified standard black and white camera tube for colour television the transmission system according to the present invention is not only simple, but is compatible with existing television receiving apparatus, coloured or black and white. If the transmitted signals are received by an ordinary black and white television receiver, there is no discrimination between the colours which are merely rendered as shades of grey and the high repetition frequency of the index signals will avoid any pattern formation on the screen. For existing colour television receiving apparatus such, for example, as that employing the Trinoscope system, no modification is necessary provided that the frequency of the synchronising signal transmitted is the same as what is known as the "gating" or sampling frequency of such receivers. In such cases the existing circuits will serve to discriminate accurately between the colours.

I claim:

1. A colour television transmission system employing a cathode ray tube including a surface scanned by an electron beam, comprising a colour filter consisting of a plurality of sets of differently coloured strips arranged at an angle to the line scanning movement of said electron beam, a plurality of non-coloured strips arranged between said sets of coloured strips, means for projecting an image of said colour filter and said non-colour strips on to the surface scanned by said electron beam, means for illuminating said colour filter and said non-colour strips so as to cause the scanning beam in scanning the image of the non-colour strips to produce therefrom index signals which are stronger than the signals produced due to the scanning of the image of the coloured strips, means for imparting a time-delay to the said index signals, means for varying the time-delay thus imparted to said index signals as a function of the scanning movement of said electron beam across said color strips, and means controlled by said stronger index signals for suppressing the signals due to all but one of said colour strips of each set sequentially for each colour.

2. A colour television transmission system employing a cathode ray tube including a surface scanned by an electron beam, comprising a colour filter consisting of a plurality of sets of differently coloured transparent strips arranged at an angle to the line scanning movement of the said electron beam, a plurality of non-colour strips arranged between said sets of coloured strips, means for projecting an image of said colour filter and said non-colour strips on to the surface scanned by said electron beam, means for illuminating at least said non-colour strips so as to cause the scanning beam in scanning the image thereof to produce therefrom index signals which are stronger than the signals produced due to the scanning of the image of the coloured strips, means for imparting a time-delay to the said index signals, means for varying the delay time thus imparted to said index signals in accordance with the scanning movement of said electron beam across said color strips, and means controlled by said stronger index signals for suppressing the signals due to all but one of said coloured strips of each set sequentially for each colour.

3. A colour television transmission system employing a cathode ray tube including a surface scanned by an electron beam, comprising a colour filter consisting of a plurality of sets of differently coloured transparent strips arranged at an angle to the line scanning movement of said electron beam, a plurality of light-reflecting non-colour strips arranged between said sets of coloured strips, means for projecting an image of said colour filter and said light-reflecting strips on to the surface scanned by said electron beam, means for illuminating said colour filter and said light-reflecting strips from the rear so as to cause the scanning beam in scanning the image of the light-reflecting strips to produce therefrom index signals which are stronger than the signals produced due to the scanning of the image of the coloured strips, means for imparting a time-delay to the said index signals, means for varying the delay time thus imparted to said index signals, and means controlled by said stronger index signals for suppressing the signals due to all but one of said coloured strips of each set sequentially for each colour.

4. A colour television transmission system employing a cathode ray tube including a surface scanned by an electron beam, comprising a colour filter consisting of a plurality of sets of differently coloured transparent strips arranged at an angle to the line scanning movement of said electron beam, a plurality of light-reflecting non-colour strips arranged between said sets of coloured strips, means for projecting an image of said colour filter and said light-reflecting strips on to the surface scanned by said electron beam, means for illuminating said colour filter and said light-reflecting strips from the rear so as to cause the scanning beam in scanning the image of the light-reflecting strips to produce therefrom index signals which are stronger than the signals produced due to the scanning of the image of the coloured strips, means for imparting a time-delay to the said index signals, means for varying the delay time thus imparted to said index signals as a function of the scanning movement of said electron beam across said color strips, and means controlled by said stronger index signals for suppressing the signals due to all but one of said coloured strips for each set sequentially for each colour at a frequency which is substantially less than the repetition frequency of the index signals.

5. A colour television transmission system employing a cathode ray tube including a surface scanned by an electron beam, comprising a colour filter consisting of a plurality of sets of differently coloured strips arranged at an angle to the line scanning movement of said electron beam, a plurality of non-color strips arranged between said sets of coloured strips one for each set, means for projecting an image of said colour filter and said non-colour strips on to the surface scanned by said electron beam, means for illuminating at least said non-colour strips so as to cause the scanning beam in scanning the image thereof to produce therefrom index signals which are stronger than the signals produced due to the scanning of the image of the coloured strips, a blocking circuit to which the signals produced by the scanning of the said surface by the electron beam are fed, an amplitude filter to select from the signals produced by the scanning of the said surface said index signals alone, a timing circuit fed by said selected index signals, a synchronising signal generator to vary the time delay of said timing circuit, a pulse generator triggered by the delayed index signals emerging from said timing circuit to open the blocking circuit at different time intervals, whereby said blocking circuit suppresses the signals due to all but one of the said coloured strips for each set sequentially for each colour, and a transmitter fed by the signals emerging from said blocking circuit.

6. A colour television transmission system according to claim 4, in which said differently coloured strips are transparent and in which said non-colour strips are adapted to reflect light diffusely, the colour filter and the non-colour strips being illuminated from behind.

7. A colour television transmission system according to claim 4, in which the frequency of the synchronising signals fed by the synchronising signal generator to the time delay circuit is substantially lower than the repetition frequency of the index signals.

8. A colour television transmission system employing a cathode ray tube including a surface scanned by an electron beam, comprising a colour filter consisting of a plurality of sets of differently coloured transparent strips and a plurality of strips adapted to reflect light diffusely between said sets of coloured strips, one for each set of differently coloured strips, arranged at an angle to the line scanning movement of said electron beam, means for projecting an image of said colour filter on to the surface scanned by said electron beam, means for illuminating said colour filter from behind so as to cause the scanning beam in scanning the image thereof to produce from the images of the light-reflecting strips index signals which are stronger than the signals produced due to the scanning of the images of the differently coloured strips, an amplitude filter fed by the output of said cathode ray tube adapted to suppress the "real" or "picture" signals and to select the index signals, a blocking circuit also fed with the full colour content signals of the output from the cathode ray tube adapted normally to block all the said signals, a transmitter fed from the output of said blocking circuit, and means controlled by the output from said amplitude filter for opening said blocking circuit so as to allow the transmission of signals due to only one of the said coloured strips of each set sequentially for each colour.

9. A colour television transmission system according to claim 8, in which the repetition frequency of the index signals is substantially higher than the frequency at which the colour value of the transmitted signals is changed.

10. A color television transmission system according to claim 5, in which the frequency of the synchronizing signals fed by the synchronizing signal generator to the time-delay circuit is substantially lower than the repetition frequency of the index signals.

References Cited in the file of this patent

UNITED STATES PATENTS

| | | |
|---|---|---|
| 2,641,642 | Behrend | June 9, 1953 |
| 2,641,643 | Wentworth | June 9, 1953 |